United States Patent
Tziovaras et al.

(10) Patent No.: US 11,731,411 B2
(45) Date of Patent: Aug. 22, 2023

(54) PLASTIC FILMS FOR ID DOCUMENTS WITH BETTER LIGHTNESS OF EMBOSSED HOLOGRAMS

(71) Applicant: Covestro Deutschland AG, Leverkusen (DE)

(72) Inventors: Georgios Tziovaras, Neuss (DE); Heinz Pudleiner, Krefeld (DE); Kira Planken, Goch (DE); Stefan Janke, Brüggen (DE); Christoph Koehler, Duisburg (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 16/954,023

(22) PCT Filed: Dec. 13, 2018

(86) PCT No.: PCT/EP2018/084663
§ 371 (c)(1),
(2) Date: Jun. 15, 2020

(87) PCT Pub. No.: WO2019/121278
PCT Pub. Date: Jun. 27, 2019

(65) Prior Publication Data
US 2021/0001614 A1 Jan. 7, 2021

(30) Foreign Application Priority Data
Dec. 22, 2017 (EP) ..................... 17209900

(51) Int. Cl.
B32B 27/08 (2006.01)
B32B 27/36 (2006.01)
(Continued)

(52) U.S. Cl.
CPC ............ *B32B 27/365* (2013.01); *B32B 7/023* (2019.01); *B32B 27/08* (2013.01); *B32B 27/302* (2013.01);
(Continued)

(58) Field of Classification Search
CPC ............ B32B 2255/10; B32B 2255/20; B32B 2255/205; B32B 2270/00; B32B 2307/30;
(Continued)

(56) References Cited

U.S. PATENT DOCUMENTS

| 3,692,744 A | 9/1972 | Rich et al. |
| 4,641,017 A * | 2/1987 | Lopata ............... G07F 7/125 235/454 |

(Continued)

FOREIGN PATENT DOCUMENTS

| DE | 1966931 A1 | 5/1975 |
| DE | 3832396 A1 | 2/1990 |

(Continued)

OTHER PUBLICATIONS

Prospector, ISO 306, retrieved Sep. 9, 2021. (Year: 2021).*
(Continued)

*Primary Examiner* — Callie E Shosho
*Assistant Examiner* — Krupa Shukla
(74) *Attorney, Agent, or Firm* — John E. Mrozinski, Jr.; Jed C. Benson

(57) ABSTRACT

The present invention relates to a layered structure containing at least one layer (i) comprising a thermoplastic material and at least one further layer (ii) comprising a thermoplastic material bearing at least one embossed hologram, to a process for producing such layer composites and to security documents, in particular identification documents, having the layered structure according to the invention.

6 Claims, 2 Drawing Sheets

(51) Int. Cl.
  B32B 7/023     (2019.01)
  B32B 27/30    (2006.01)
  C08K 5/00     (2006.01)
  G03H 1/02     (2006.01)
(52) U.S. Cl.
  CPC ......... *C08K 5/0041* (2013.01); *G03H 1/0244* (2013.01); *G03H 1/0252* (2013.01); *B32B 2255/10* (2013.01); *B32B 2255/20* (2013.01); *B32B 2270/00* (2013.01); *B32B 2307/30* (2013.01)
(58) Field of Classification Search
  CPC ............... B32B 2425/00; B32B 27/08; B32B 27/286; B32B 27/302; B32B 27/304; B32B 27/308; B32B 27/32; B32B 27/325; B32B 27/36; B32B 27/365; B32B 7/023; C08K 5/0041; G03H 1/0244; G03H 1/0252; G03H 2240/50
  See application file for complete search history.

(56) References Cited

U.S. PATENT DOCUMENTS

| | | | |
|---|---|---|---|
| 4,982,014 A | 1/1991 | Freitag et al. | |
| 5,126,428 A | 6/1992 | Freitag et al. | |
| 5,200,253 A * | 4/1993 | Yamaguchi | G03H 1/0252 264/1.7 |
| 7,674,845 B2 | 3/2010 | Van Duijnhoven et al. | |
| 7,678,451 B2 | 3/2010 | Gelissen et al. | |
| 7,771,646 B2 | 8/2010 | Clauss et al. | |
| 9,477,203 B2 | 10/2016 | Menz | |
| 2001/0023016 A1* | 9/2001 | Benz | B29C 65/02 428/213 |
| 2002/0015897 A1 | 2/2002 | Toshine et al. | |
| 2004/0190144 A1* | 9/2004 | Hannington | G03B 21/625 359/614 |
| 2007/0100122 A1* | 5/2007 | Crawford | C08L 67/02 528/272 |
| 2008/0285100 A1* | 11/2008 | Evans | G03H 1/268 359/22 |
| 2011/0193337 A1* | 8/2011 | Tziovaras | B32B 27/40 283/113 |
| 2011/0204616 A1* | 8/2011 | Geuens | B32B 27/08 156/60 |
| 2012/0001413 A1* | 1/2012 | Pudleiner | B42D 25/43 283/85 |
| 2012/0160747 A1* | 6/2012 | Striebich | B01D 46/009 156/196 |

FOREIGN PATENT DOCUMENTS

| | | |
|---|---|---|
| DE | 4025296 A1 | 2/1991 |
| EP | 2218579 A1 | 8/2010 |
| GB | 1229482 A | 4/1971 |
| JP | 2001239610 A * | 9/2001 |
| JP | 4683597 B2 | 5/2011 |
| NL | 7802830 A | 9/1979 |
| WO | WO 8903760 A1 | 5/1989 |
| WO | WO 0162516 A1 | 8/2001 |
| WO | WO 2010091796 A1 | 8/2010 |

OTHER PUBLICATIONS

Machine translation of JP-2001239610-A, retrieved Apr. 28, 2022. (Year: 2001).*
Himilan, Dow-Mitsui Polychemicals, 2022. (Year: 2022).*
Polyethylene Z322—Ube, retrieved Sep. 10, 2022. (Year: 2022).*
Kunststoff-Handbuch vol. VIII, p. 695 ff, Karl-Hanser-Verlag, Munich 1973.
D. Freitag, U. Grigo, P. R. Müller, H. Nouvertné, Bayer AG, "Polycarbonates" in Encyclopedia of Polymer Science and Engineering, vol. 11, second edition, 1988, pp. 648-718.
U. Grigo, K. Kirchner and P. R. Müller, "Polycarbonate" in Becker/Braun, Kunststoff-Handbuch, vol. 3/1, Polycarbonate, Polyacetale, Polyester, Celluloseester, Carl Hanser Verlag Munich, Vienna 1992, pp. 117-299.
H. Schnell, Chemistry and Physics of Polycarbonates, Interscience Publishers, New York 1964, p. 28 ff.; p. 102 ff.
D. G. Legrand, J.T. Bendler, Handbook of Polycarbonate Science and Technology, Marcel Dekker New York 2000, p. 72 ff.
International Search Report, PCT/EP2018/084663, dated Feb. 15, 2019, Authorized officer: M. Flores de Paco.

* cited by examiner

PLASTIC FILMS FOR ID DOCUMENTS WITH BETTER LIGHTNESS OF EMBOSSED HOLOGRAMS

CROSS-REFERENCE TO RELATED APPLICATION

This application is a national stage application under 35 U.S.C. § 371 of PCT/EP2018/084663, filed Dec. 13, 2018, which claims the benefit of European Application No. 17209900, filed Dec. 22, 2017, each of which is incorporated herein by reference.

FIELD

The present invention relates to a layered structure containing at least one layer (i) comprising a thermoplastic material and at least one further layer (ii) comprising a thermoplastic material bearing at least one embossed hologram, to a process for producing such layer composites and to security documents, in particular identification documents, having the layered structure according to the invention.

BACKGROUND

For the production of security documents typically films made of PETG or PVC for the core of the security document and films based on polycarbonates in the outer layers are combined to afford a film stack and in a laminating press compressed under pressure and temperature to afford a solid layer composite. These security documents may be personalized as desired or provided with security elements which are typically introduced into the layer composite before lamination. However, the core of such security documents may also contain polycarbonate films.

Embossed holograms in security documents, preferably identification documents, are a well-known element to increase the anti-counterfeiting security of the documents. Anti-counterfeiting security is achieved when the tester of the document can determine by visual inspection of the embossed hologram alone whether an original or counterfeit embossed hologram is concerned.

WO-A 2010/091796 discloses the production of a laminated layer composite wherein at least one base layer and at least one further layer having a component part arranged in between and composed of two thermoplastic materials having different vicat softening temperatures B/50 are laminated in a two-stage process to afford a layer composite, wherein the thermoplastic material having the lower softening temperature envelops the component in the laminated layer composite.

WO-A 2012/164011 discloses the transfer of an embossed hologram from a carrier film to a polycarbonate film and subsequent embedding of this embossed hologram in a layer composite.

Two types of embossed holograms may be used in security documents: The first type are so-called transfer embossed holograms. These are embossed on a separate plastic film and subsequently the embossed piece of plastic film is bonded to the plastic film from which the security document is made and subsequently laminated.

Transfer embossed holograms are generally made of a particularly thin polyester film, in the thickness range 5-25 µm. The nanostructures which refract light after metallization of the film are embossed into the film via rotating rollers. The embossing rollers are sheathed with the so-called "master" which is a metal sheet bearing the incorporated embossing structures. After embossing the holograms are provided with a metallization which varies in its opacity depending on the desired appearance of the embossed hologram. Thus embossed holograms may be kept approximately transparent or have an opaque metallic appearance. Subsequently a thin adhesive layer is applied to the embossed and metallized side of the embossed holograms. This is generally a heat-activatable adhesive which makes it possible to get the embossed holograms to adhere to the plastic films of the security documents—so-called "transfer embossed holograms". The embossed hologram is placed on the plastic film with its adhesive-coated side and is subsequently bonded to the plastic film with a roller laminator. The activation temperature of the adhesive layer is lower than the softening temperature of the hologram film so that no deformation of the nanostructures of the embossed hologram can take place. The heated laminating rollers are generally soft rollers made of rubber or silicone so that the nanostructures of the embossed holograms cannot be damaged.

In the second type of embossed holograms a so-called master embosses the nanostructures of the holograms directly onto the surface of a film used for producing the security documents, for example into the surface of a polycarbonate film having a thickness of 30 µm or more.

In the production of security documents different plastic films may be placed on top of one another in a stack of a two or more plastic films, generally three to fifteen plastic films and laminated to afford a solid layer composite. The film stack may have white plastic films placed in the middle plies and transparent plastic films placed in the outer plies. The embossed hologram is ideally applied to a transparent plastic film which later also forms the front side of the security document and a further transparent plastic film for protection of the embossed hologram is placed thereupon to protect the embossed hologram. This stack of plastic films is usually aligned, fixed and pressed in a laminating press under the action of heat and pressure for a certain period of time, thus forming a monolithic composite of the film layers, a so-called laminate.

In this laminating step it is particularly important to select the pressure and the temperature such that embossed holograms are not damaged during the laminating operation. If an excessive pressure is chosen the nanostructures of the embossed hologram are damaged. The temperature for the lamination must be chosen such that the plastic film stack forms a solid composite which does not subsequently disintegrate into the individual layers again. The result of this is that embossed holograms in the security document differ markedly from their original appearance. They appear matt, the details of their shape are not clearly apparent and refraction of light decreases significantly, and colors are barely apparent anymore.

SUMMARY

The invention accordingly has for its object to provide a layered structure which allows application of embossed holograms whose embossing and appearance remain virtually unchanged in color and shape even after lamination to afford a solid layer composite. It is a further object of the invention that this layered structure be readily laminatable and after lamination exhibit good adhesion between the individual layers of the layered structure.

BRIEF DESCRIPTION OF THE DRAWINGS

Various features and characteristics of the inventions described in this specification may be better understood by reference to the accompanying figures, in which.

DETAILED DESCRIPTION

Figure 1:
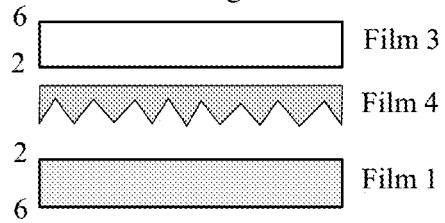
FIG. 1 is a schematic diagram of layered structure 1.

It has now been found that, surprisingly, a layered structure containing at least one layer (i) comprising a thermoplastic material and at least one further layer (ii) comprising a thermoplastic material, characterized in that the vicat softening temperature B/50 determined according to ISO 306 (50N; 50°/h) of layer (i) is ≥3° C. to ≤45° C., preferably ≥10° C. to ≤40° C., particularly preferably ≥15° C. to ≤30° C., higher or lower than the softening temperature of layer (ii) and in that at least one embossed hologram is applied to the layer (i) or (ii) such that the nanostructure of the at least one embossed hologram points in the direction of the layer having the lower softening temperature, shows an embossed hologram after lamination to a solid layer composite which is present in the solid layer composite virtually unchanged in color and shape.

The layered structure according to the invention may comprise further layers. The essential layers (i) and (ii) typically form outer layers of the layered structure which may optionally be provided with a further protective layer, a so-called overlay film.

The layered structure according to the invention may be laminated to afford a security document or multilayer composite material by known methods. This is typically carried out in a laminating press in which the film bundle is intimately joined under the action of pressure and temperature. It is advantageous here when at least one of the core films or the outer films exhibits a very good adhesion propensity during the lamination process. This makes it possible to accelerate the process of producing these film composites. The adhesion of the outer films to the core film is also improved. This core film may be transparent and/or colored and have good mechanical properties. The outer films may also be laser-printable.

In the context of the invention ppm is to be understood as meaning ppm by weight unless otherwise stated.

The thermoplastic material of the at least one layer (i) and the at least one further layer (ii) may preferably be at least one plastic selected from polymers of ethylenically unsaturated monomers and/or polycondensates of difunctional reactive compounds and/or polyaddition products of difunctional reactive compounds or mixtures thereof. For certain applications it may be advantageous and hence preferred to use a transparent thermoplastic material.

Particularly suitable thermoplastic materials of layers (i) and (ii) are polycarbonates or copolycarbonates based on diphenols, poly- or copolyacrylates and poly- or copolymethacrylates, for example and preferably polymethyl methacrylate (PMMA), poly- or copolymers with styrene, for example and preferably polystyrene (PS) or polystyrene acrylonitrile (SAN), thermoplastic polyurethanes and polyolefins, for example and preferably, polypropylene types or polyolefins based on cyclic olefins (for example TOPAS™), poly- or copolycondensates of an aromatic dicarboxylic acid and aliphatic, cycloalophatic and/or araliphatic diols having 2 to 16 carbon atoms, for example and preferably poly- or copolycondensates of terephthalic acid, particularly preferably poly- or copolyethylene terephthalate (PET or CoPET), glycol-modified PET (PETG), glycol-modified poly- or copolycyclohexanedimethylene terephthalate (PCTG) or poly- or copolybutylene terephthalate (PBT or CoPBT), preferably poly- or copolycondensates of naphthalenedicarboxylic acid, particularly preferably polyethylene glycol naphthalate (PEN), poly- or copolycondensate(s) of at least one cycloalkyldicarboxylic acid, for example and preferably polycyclohexanedimethanolcyclohexanedicarboxylic acid (PCCD), polysulfones (PSU), polyvinyl halides, for example and preferably polyvinyl chloride (PVC), or mixtures of the abovementioned.

Preferred thermoplastic materials of layers (i) and (ii) are polycarbonates or copolycarbonates based on diphenols, poly- or copolycondesates of an aromatic dicarboxylic acid and aliphatic, cycloalophatic and/or araliphatic diols having 2 to 16 carbon atoms, for example and preferably poly- or copolycondensates of terephthalic acid, particularly preferably poly- or copolyethylene terephthalate (PET or CoPET), glycol-modified PET (PETG), glycol-modified poly- or copolycyclohexanedimethylene terephthalate (PCTG) or poly- or copolybutylene terephthalate (PBT or CoPBT), preferably poly- or copolycondensates of naphthalenedicarboxylic acid, for example and particularly preferably polyethylene glycol naphthalate (PEN), poly- or copolycondensate(s) of at least one cycloalkyldicarboxylic acid, for example and preferably, polycyclohexanedimethanolcyclohexanedicarboxylic acid (PCCD), polysulfones (PSU), polyvinyl halides, for example and preferably polyvinyl chloride (PVC) or mixtures of the abovementioned.

In a preferred embodiment at least one layer (i) or (ii) comprises a thermoplastic material selected from the group of polycarbonates or copolycarbonates based on diphenols, poly- or copolycondensates of terephthalic acid, preferably poly- or copolyethylene terephthalate (PET or CoPET), glycol-modified PET (PETG), glycol-modified poly- or copolycyclohexanedimethylene terephthalate (PCTG) or poly- or copolybutylene terephthalate (PBT or CoPBT), poly- or copolycondensates of naphthalenedicarboxylic acid, preferably polyethylene glycol naphthalate (PEN), poly- or copolycondensate(s) of at least one cycloalkyldicarboxylic acid, preferably polycyclohexanedimethanolcyclohexanedicarboxylic acid (PCCD), polysulfones (PSU), polyvinyl halides, preferably polyvinyl chloride (PVC) or mixtures of the aforementioned, wherein the crystalline proportion of the aforementioned thermoplastic materials in layer (i) or (ii) comprises ≤40% by weight, preferably 0 to ≤30% by weight, particularly preferably 0 to ≤25% by weight.

In a particularly preferred embodiment at least one layer (i) or (ii) comprises a thermoplastic material comprising
a) at least one or more poly- or copolycondensate(s) of an aromatic and/or cycloalkyldicarboxylic acid and aliphatic, cycloaliphatic and/or araliphatic diols having 2 to 16 carbon atoms, wherein the poly- or copolycondensate(s) of an aromatic and/or cycloalkyldicarboxylic acid and aliphatic, cycloaliphatic and/or araliphatic diols having 2 to 16 carbon atoms comprise a proportion of 1,4-cyclohexanedimethanol, 1,3-cyclohexanedimethanol and/or 2,2,4,4-tetramethyl-1,3-cyclobutanediol in a range from ≥20 to ≤80 mol % based on the diol component, b) a blend of at least one or more poly- or copolycondensate (s) of an aromatic and/or cycloalkyldicarboxylic acid and aliphatic, cycloaliphatic and/or araliphatic diols having 2 to 16 carbon atoms with one or more poly- or copolycarbonate(s), wherein the proportion of poly- or copolycarbonate (s) in this blend is in a range from ≥50% to ≤90% by weight and wherein the poly- or copolycondensate(s) of an aromatic and/or cycloalkyldicarboxylic acid and aliphatic, cycloaliphatic and/or araliphatic diols having 2 to 16 carbon atoms comprise a proportion of 1,4-cyclohexanedimethanol, 1,3-cyclohexanedimethanol and/or 2,2,4,4-tetramethyl-1,3-cyclobutanediol in a range from ≥20 to ≤80 mol %, preferably in a range from ≥25 to ≤75 mol %, particularly preferably in a range from ≥25 to ≤70 mol %, based on the diol component, or c) a blend of poly- or copolycarbonates containing difunctional carbonate structural units of formula (II)

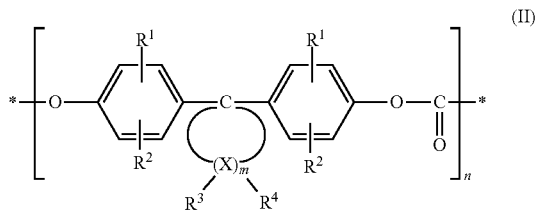

(II)

wherein
$R^1$ and $R^2$ independently of one another represent hydrogen, halogen, preferably chlorine or bromine, $C_1$-$C_8$-alkyl, $C_5$-$C_6$-cycloalkyl, $C_6$-$C_{10}$-aryl, preferably phenyl, and $C_7$-$C_{12}$-aralkyl, preferably phenyl-$C_1$-$C_4$-alkyl, in particular benzyl,
m is an integer from 4 to 7, preferably 4 or 5,
$R^3$ and $R^4$ individually selectable for each X independently of one another represent hydrogen or $C_1$-$C_6$-alkyl,
X represents carbon and
n is an integer greater than 20,
with the proviso that for at least one atom X, $R^3$ and $R^4$ both represent alkyl.

The poly- or copolycondensates and the blends of the poly- or copolycondensates and the polycarbonates are more particularly described hereinbelow with preferred embodiments.

The poly- or copolycondensates of an aromatic and/or cycloalkyl dicarboxylic acid and aliphatic, cycloaliphatic and/or araliphatic diols having 2 to 16 carbon atoms may be produced by known methods from the corresponding dicarboxylic acid (or its reactive derivatives) and aliphatic, cycloaliphatic and/or araliphatic diols having 2 to 16 carbon atoms (Kunststoff-Handbuch vol. VIII, p. 695 ff, Karl-Hanser-Verlag, Munich 197. Compounds employable as the dicarboxylic acid of the poly- or copolycondensate include at least one compound from the group of orthophthalic acid, terephthalic acid, isophthalic acid, tert-butylisophthalic acid, 3,3'-diphenyldicarboxylic acid, 4,4'-diphenyldicarboxylic acid, 4,4-benzophenonedicarboxylic acid, 3,4'-benzophenonedicarboxylic acid, 4,4'-diphenyl ether dicarboxylic acid, 4,4'-diphenylsulfonedicarboxylic acid, 2,2-bis(4-carboxyphenyl)propane, trimethyl-3-phenylindane-4,5'-dicarboxylic acid, naphthalene-1,4-dicarboxylic acid, naphthalene-1,5-dicarboxylic acid, naphthalene-2,6-dicarboxylic acid and/or cyclohexanedicarboxylic acid or the reactive derivatives of the recited dicarboxylic acids, preferably terephthalic acid, naphthalene-1,4-dicarboxylic acid, naphthalene-1,5-dicarboxylic acid, naphthalene-2,6-dicarboxylic acid and/or isophthalic acid or the reactive derivatives of the recited dicarboxylic acids, particularly preferably terephthalic acid and/or isophthalic acid or their reactive derivatives and very particularly preferably terephthalic acid or a reactive derivative of terephthalic acid.

In addition to the abovementioned dicarboxylic acids the acid component of the poly- or copolycondensate may also contain up to 20 mol % of other aromatic dicarboxylic acids having 8 to 14 carbon atoms or aliphatic dicarboxylic acids having 4 to 12 carbon atoms, for example phthalic acid, isophthalic acid, naphthalene-2,6-dicarboxylic acid, 4,4'-diphenyldicarboxylic acid, succinic, adipic, sebacic acid, malonic acid, glutaric acid, dodecanedicarboxylic acid, suberic acid, pimelic acid, azelaic acid, cyclohexanediacetic acid.

The poly- or copolycondensate of the aromatic and/or cycloalkyldicarboxylic acid and aliphatic, cycloaliphatic and/or araliphatic diols having 2 to 16 carbon atoms preferably comprises a proportion of 1,4-cyclohexanedimethanol, 1,3-cyclohexanedimethanol and/or 2,2,4,4-tetramethyl-1,3-cyclobutanediol in a range from ≥20 to ≤80 mol %, preferably ≥25 to ≤75 mol % and particularly preferably ≥25 to ≤70 mol % based on the diol component.

Compounds employable as the diol component of the poly- or copolycondensate include aliphatic, cycloaliphatic or araliphatic diols having 2 to 16 carbon atoms, for example ethylene glycol, diethylene glycol, 1,2-propanediol, 1,3-propanediol, neopentyl glycol, 1,4-butanediol, 1,5-pentanediol, 1,6-hexanediol, p-xylenediol and mixtures of at least two of the abovementioned compounds, preferably ethylene glycol, diethylene glycol, 1,4-butanediol and mixtures of at least two of the abovementioned compounds.

The diol component may also contain up to 10 mol % of other aliphatic diols having 3 to 12 carbon atoms or cycloaliphatic diols having 6 to 21 carbon atoms, for example, 2-ethylpropane-1,3-diol, 3-methylpentane-2,4-diol, 2-methylpentane-2,4-diol, 2,2,4-trimethylpentane-1,3-diol and 2-ethylhexane-1,6-diol, 2,2-diethylpropane-1,3-diol, hexane-2,5-diol, 1,4-di-([beta]hydroxyethoxy)benzene, 2,2-bis(4-hydroxycyclohexyl)propane, 2,4-dihydroxy-1,1,3,3-tetramethylcyclobutane, 2,2-bis-(3-[beta]-hydroxyethoxyphenyl)propane and 2,2-bis(4-hydroxypropoxyphenyl)propane (cf. DE-OS 24 07 674, 24 07 776, 27 15 932), 1,4:3,6-Dianhydro-D-sorbitol (isosorbide) and 2,4,8,10-tetraoxaspiro[5.5]undecane-3,9-diethanol and mixtures of at least two of the abovementioned compounds.

In preferred embodiments of the invention suitable poly- or copolycondensates of terephthalic acid are polyalkylene terephthalates. Suitable polyalkylene terephthalates are for example reaction products of aromatic dicarboxylic acids or their reactive derivatives (for example dimethyl esters or anhydrides) and aliphatic, cycloaliphatic or araliphatic diols and mixtures of these reaction products.

Preferred polyalkylene terephthalates are producible from terephthalic acid (or reactive derivatives thereof) and aliphatic, cycloaliphatic or araliphatic diols having 2 to 16 carbon atoms by known methods (Kunststoff-Handbuch, vol. VIII, p. 695 ff, Karl-Hanser-Verlag, Munich 1973).

Preferred polyalkylene terephthalates contain at least 80 mol %, preferably 90 mol %, of terephthalic acid radicals based on the dicarboxylic acid component and ≥20 to ≤80 mol %, preferably ≥25 to ≤75 mol % and particularly preferably ≥25 to ≤70 mol % of 1,4-cyclohexanedimethanol, 1,3-cyclohexanedimethanol and/or 2,2,4,4-tetramethyl-1,3-cyclobutanediol, preferably 1,4-cyclohexanedimethanol and/or 1,3-cyclohexanedimethanol, based on the diol component and ≥20 to ≤80 mol %, preferably ≥25 to ≤75 mol %, particularly preferably ≥30 to ≤75 mol % of ethylene glycol, diethylene glycol and/or 1,4-butanediol based on the diol component.

The preferred polyalkylene terephthalates may be branched by incorporation of relatively small amounts of tri- or tetrahydric alcohols or tri- or tetrabasic carboxylic acids, as described for example in DE-OS 19 00 270 and US-PS 3 692 744. Examples of preferred branching agents are trimesic acid, trimellitic acid, trimethylolethane and trimethylolpropane and pentaerythritol.

It is preferable when not more than 1 mol % of the branching agent based on the acid or on the alcohol component is used.

Particular preference is given to polyalkylene terephthalates produced solely from terephthalic acid and their reactive derivatives (for example their dialkyl esters) and 1,4-cyclohexanedimethanol, 1,3-cyclohexanedimethanol, ethylene glycol and/or butane-1,4-diol and to mixtures of these polyalkylene terephthalates.

Preferred polyalkylene terephthalates also include copolyesters produced from at least two of the abovementioned acid components and/or from at least two of the abovementioned alcohol components and particularly preferred copolyesters are poly(ethylene glycol/cyclohexane-1,4-dimethanol/butane-1,4-diol) terephthalates, poly(ethylene glycol/cyclohexane-1,4-dimethanol/diethylene glycol) terephthalates, poly(ethylene glycol/cyclohexane-1,4-dimethanol) terephthalates and/or poly(butane-1,4-diol) terephthalates.

The polyalkylene terephthalates preferably used as a component preferably have an intrinsic viscosity of about 0.4 to 1.5 dl/g, preferably 0.5 to 1.3 dl/g, in each case measured in phenol/o-dichlorobenzene (1:1 parts by weight) at 25° C.

In the context of the invention polycarbonate is to be understood as including poly- and/or copolycarbonate.

In preferred embodiments suitable poly- or copolycarbonates include in particular aromatic polycarbonates or copolycarbonates.

The polycarbonates or copolycarbonates may be linear or branched in known fashion. These polycarbonates may be produced in known fashion from diphenols, carbonic acid derivatives, optionally chain terminators and optionally branching agents. Particulars pertaining to the production of polycarbonates are disclosed in many patent documents spanning approximately the last 40 years. Reference is made here merely by way of example to Schnell, "Chemistry and Physics of Polycarbonates", Polymer Reviews, volume 9, Interscience Publishers, New York, London, Sydney 1964, to D. Freitag, U. Grigo, P. R. Müller, H. Nouverté, BAYER AG, "Polycarbonates" in Encyclopedia of Polymer Science and Engineering, volume 11, second edition, 1988, pages 648-718 and finally to Dres. U. Grigo, K. Kirchner and P. R. Müller, "Polycarbonate" in Becker/Braun, Kunststoff-Handbuch, volume 3/1, Polycarbonate, Polyacetale, Polyester, Celluloseester, Carl Hanser Verlag Munich, Vienna 1992, pages 117-299.

Suitable diphenols may include for example dihydroxyaryl compounds of general formula (I),

HO—Z—OH  (I)

wherein Z is an aromatic radical having 6 to 34 carbon atoms which may contain one or more optionally substituted aromatic rings and aliphatic or cycloaliphatic radicals or alkylaryls or heteroatoms as bridging members.

Examples of suitable dihydroxyaryl compounds include: dihydroxybenzenes, dihydroxydiphenyls, bis(hydroxyphenyl)alkanes, bis(hydroxyphenyl)cycloalkanes, bis(hydroxyphenyl)aryls, bis(hydroxyphenyl) ethers, bis(hydroxyphenyl) ketones, bis(hydroxyphenyl) sulfides, bis (hydroxyphenyl) sulfones, bis(hydroxyphenyl) sulfoxides, 1,1'-bis(hydroxyphenyl)diisopropylbenzenes and the ring-alkylated and ring-halogenated compounds thereof.

These and further suitable other dihydroxyaryl compounds are described, for example, in DE-A 3 832 396, FR-A 1 561 518, in H. Schnell, Chemistry and Physics of Polycarbonates, Interscience Publishers, New York 1964, p. 28 ff.; p. 102 ff., and in D. G. Legrand, J. T. Bendler, Handbook of Polycarbonate Science and Technology, Marcel Dekker New York 2000, p. 72 ff. beschrieben.

Preferred dihydroxyaryl compounds are for example resorcinol, 4,4'-dihydroxydiphenyl, bis(4-hydroxyphenyl) methane, bis(3,5-dimethyl-4-hydroxyphenyl)methane, bis (4-hydroxyphenyl)diphenylmethane, 1,1-bis(4-hydroxyphenyl)-1-phenylethane, 1,1-bis(4-hydroxyphenyl)-1-(1-naphthyl)ethane, 1,1-bis(4-hydroxyphenyl)-1-(2-naphthyl) ethane, 2,2-bis(4-hydroxyphenyl)propane, 2,2-bis(3-methyl-4-hydroxyphenyl)propane, 2,2-bis(3,5-dimethyl-4-hydroxyphenyl)propane, 2,2-bis(4-hydroxyphenyl)-1-phenylpropane, 2,2-bis(4-hydroxyphenyl) hexafluoropropane, 2,4-bis(4-hydroxyphenyl)-2-methylbutane, 2,4-bis(3,5-dimethyl-4-hydroxyphenyl)-2-methylbutane, 1,1-bis(4-hydroxyphenyl)cyclohexane, 1,1-bis(3,5-dimethyl-4-hydroxyphenyl)cylohexane, 1,1-bis(4-hydroxyphenyl)-4-methylcyclohexane, 1,3-bis[2-(4-hydroxyphenyl)-2-propyl]benzene, 1,1'-bis(4-hydroxyphenyl)-3-diisopropylbenzene, 1,1'-bis(4-hydroxyphenyl)-4-diisopropylbenzene, 1,3-bis[2-(3,5-dimethyl-4-hydroxyphenyl)-2-propyl]benzene, bis(4-hydroxyphenyl) ether, bis(4-hydroxyphenyl) sulfide, bis(4-hydroxyphenyl) sulfone, bis(3,5-dimethyl-4-hydroxyphenyl) sulfone and 2,2',3,3'-tetrahydro-3,3,3',3'-tetramethyl-1,1'-spirobis[1H-indene]-5,5'-diol or dihydroxydiphenycycloalkanes of formula (Ia)

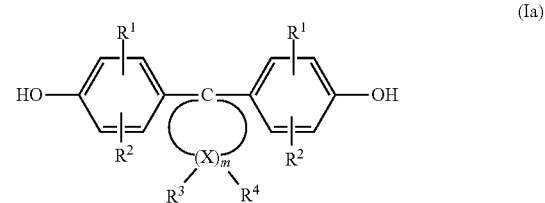

(Ia)

wherein
$R^1$ and $R^2$ independently of one another represent hydrogen, halogen, preferably chlorine or bromine, $C_1$-$C_8$-alkyl, $C_5$-$C_6$-cycloalkyl, $C_6$-$C_{10}$-aryl, preferably phenyl, and $C_7$-$C_{12}$-aralkyl, preferably phenyl-$C_1$-$C_4$-alkyl, in particular benzyl,
m is an integer from 4 to 7, preferably 4 or 5,
$R^3$ and $R^4$ individually selectable for each X independently of one another represent hydrogen or $C_1$-$C_6$-alkyl and
X represents carbon,
with the proviso that for at least one atom X, $R^3$ and $R^4$ both represent alkyl. It is preferable when in formula (Ia) for one or two atom(s) X, especially only for one atom X, $R^3$ and $R^4$ both represent alkyl.

A preferred alkyl radical for the radicals $R^3$ and $R^4$ in formula (Ia) is methyl. The X atoms alpha to the diphenyl-substituted carbon atom (C-1) are preferably not dialkyl-substituted but the alkyl disubstitution beta to C-1 is preferred.

Particularly preferred dihydroxydiphenylcycloalkanes of formula (Ia) are those having 5 and 6 ring carbon atoms X in the cycloaliphatic radical (m=4 or 5 in formula (Ia)), for example the diphenols of formulae (Ia-1) to (Ia-3),

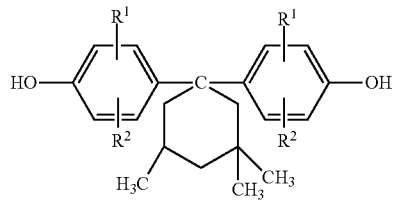
(Ia-1)

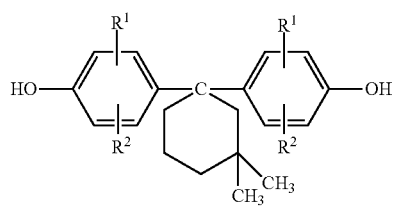
(Ia-2)

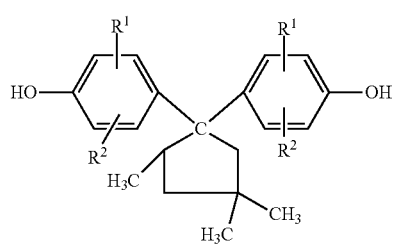
(Ia-3)

A very particularly preferred dihydroxydiphenylcycloalkane of formula (Ia) is 1,1-bis(4-hydroxyphenyl)-3,3,5-trimethylcyclohexane (formula (Ia-1) where $R^1$ and $R^2$ represent H).

Such polycarbonates may be produced from dihydroxydiphenylcycloalkanes of formula (Ia) according to EP-A 359 953.

Particularly preferred dihydroxyaryl compounds are resorcinol, 4,4'-dihydroxydiphenyl, bis(4-hydroxyphenyl)diphenylmethane, 1,1-bis(4-hydroxyphenyl)-1-phenylethane, bis(4-hydroxyphenyl)-1-(1-naphthyl)ethane, bis(4-hydroxyphenyl)-1-(2-naphthyl)ethane, 2,2-bis(4-hydroxyphenyl)propane, 2,2-bis(3,5-dimethyl-4-hydroxyphenyl)propane, 1,1-bis(4-hydroxyphenyl)cyclohexane, 1,1-bis(3,5-dimethyl-4-hydroxyphenyl)cyclohexane, 1,1-bis(4-hydroxyphenyl)-3,3,5-trimethylcyclohexane, 1,1'-bis(4-hydroxyphenyl)-3-diisopropylbenzene and 1,1'-bis(4-hydroxyphenyl)-4-diisopropylbenzene.

Very particularly preferred dihydroxyaryl compounds are 4,4'-dihydroxydiphenyl and 2,2-bis(4-hydroxyphenyl)propane.

It is possible to use either one dihydroxyaryl compound to form homopolycarbonates or different dihydroxyaryl compounds to form copolycarbonates. It is possible to use either one dihydroxyaryl compound of formula (I) or (Ia) to form homopolycarbonates or two or more dihydroxyaryl compounds of formula(e) (I) and/or (Ia) to form copolycarbonates. The various dihydroxyaryl compounds may be linked to one another randomly or blockwise. In the case of copolycarbonates composed of dihydroxyaryl compounds of formulae (I) and (Ia) the molar ratio of dihydroxyaryl compounds of formula (Ia) to the optionally co-usable dihydroxyaryl compounds of formula (I) is preferably between 99 mol % of (Ia) to 1 mol % of (I) and 2 mol % of (Ia) to 98 mol % of (I), preferably between 99 mol % of (Ia) to 1 mol % of (I) and 10 mol % of (Ia) to 90 mol % of (I), and especially between 99 mol % of (Ia) to 1 mol % of (I) and 30 mol % of (Ia) to 70 mol % of (I).

A very particularly preferred copolycarbonate may be produced using 1,1-bis(4-hydroxyphenyl)-3,3,5-trimethylcyclohexane and 2,2-bis(4-hydroxyphenyl)propane dihydroxyaryl compounds of formulae (Ia) and (I).

Suitable carbonic acid derivatives include for example diaryl carbonates of general formula (III)

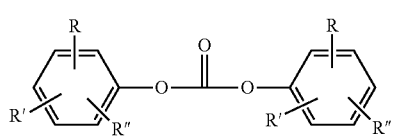
(III)

wherein
R, R' and R" are independently of one another identical or different and represent hydrogen, linear or branched $C_1$-$C_{34}$-alkyl, $C_7$-$C_{34}$-alkylaryl or $C_6$-$C_{34}$-aryl, R may additionally also represent —COO—R'", wherein R'" represents hydrogen, linear or branched $C_1$-$C_{34}$-alkyl, $C_7$-$C_{34}$-alkylaryl or $C_6$-$C_{34}$-aryl.

Preferred diaryl carbonates are for example diphenyl carbonate, methylphenyl phenyl carbonates and di(methylphenyl) carbonates, 4-ethylphenyl phenyl carbonate, di(4-ethylphenyl) carbonate, 4-n-propylphenyl phenyl carbonate, di(4-n-propylphenyl) carbonate, 4-isopropylphenyl phenyl carbonate, di(4-isopropylphenyl) carbonate, 4-n-butylphenyl phenyl carbonate, di(4-n-butylphenyl) carbonate, 4-isobutylphenyl phenyl carbonate, di(4-isobutylphenyl) carbonate, 4-tert-butylphenyl phenyl carbonate, di(4-tert-butylphenyl) carbonate, 4-n-pentylphenyl phenyl carbonate, di(4-n-pentylphenyl) carbonate, 4-n-hexylphenyl phenyl carbonate, di(4-n-hexylphenyl) carbonate, 4 isooctylphenyl phenyl carbonate, di(4-isooctylphenyl) carbonate, 4-n-nonylphenyl phenyl carbonate, di(4-n-nonylphenyl) carbonate, 4-cyclohexylphenyl phenyl carbonate, di(4-cyclohexylphenyl) carbonate, 4-(1-methyl-1-phenylethyl)phenyl phenyl carbonate, di[4-(1-methyl-1-phenylethyl)phenyl]carbonate, biphenyl-4-yl phenyl carbonate, di(biphenyl-4-yl) carbonate, 4-(1-naphthyl)phenyl phenyl carbonate, 4-(2-naphthyl) phenyl phenyl carbonate, di[4-(1-naphthyl)phenyl] carbonate, di[4-(2-naphthyl)phenyl] carbonate, 4-phenoxyphenyl phenyl carbonate, di(4-phenoxyphenyl) carbonate, 3-pentadecylphenyl phenyl carbonate, di(3-pentadecylphenyl) carbonate, 4-tritylphenyl phenyl carbonate, di(4-tritylphenyl) carbonate, (methyl salicylate) phenyl carbonate, di(methyl salicylate) carbonate, (ethyl salicylate) phenyl carbonate, di(ethyl salicylate) carbonate, (n-propyl salicylate) phenyl carbonate, di(n-propyl salicylate) carbonate, (isopropyl salicylate) phenyl carbonate, di(isopropyl salicylate) carbonate, (n-butyl salicylate) phenyl carbonate, di(n-butyl salicylate) carbonate, (isobutyl salicylate) phenyl carbonate, di(isobutyl salicylate) carbonate, (tert-butyl salicylate) phenyl carbonate, di(tert-butyl salicylate) carbonate, di(phenyl salicylate) carbonate and di(benzyl salicylate) carbonate.

Particularly preferred diaryl compounds are diphenyl carbonate, 4-tert-butylphenyl phenyl carbonate, di(4-tertbutylphenyl) carbonate, biphenyl-4-yl phenyl carbonate, di(biphenyl-4-yl) carbonate, 4-(1-methyl-1-phenylethyl) phenyl phenyl carbonate, di[4-(1-methyl-1-phenylethyl) phenyl]carbonate and di(methyl salicylate) carbonate.

Diphenyl carbonate is very particularly preferred.

It is possible to use either one diaryl carbonate or different diaryl carbonates.

To control or alter the end groups it is also possible to employ for example one or more monohydroxyaryl compound(s) not used to produce the diaryl carbonate(s) as chain terminators. These may be selected from those of general formula (IV)

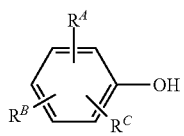

(IV)

wherein
$R^A$ represents linear or branched $C_1$-$C_{34}$-alkyl, $C_7$-$C_{34}$-alkylaryl, $C_6$-$C_{34}$-aryl or —COO—$R^D$, wherein $R^D$ represents hydrogen, linear or branched $C_1$-$C_{34}$-alkyl, $C_7$-$C_{34}$-alkylaryl or $C_6$-$C_{34}$-aryl and
$R^B$, $R^C$ are independently of one another identical or different and represent hydrogen, linear or branched $C_1$-$C_{34}$-alkyl, $C_7$-$C_{34}$-alkylaryl or $C_6$-$C_{34}$-aryl.

Such monohydroxyaryl compounds are, for example, 1-, 2- or 3-methylphenol, 2,4-dimethylphenol 4-ethylphenol, 4-n-propylphenol, 4-isopropylphenol, 4-n-butylphenol, 4-isobutylphenol, 4-tert-butylphenol, 4-n-pentylphenol, 4-n-hexylphenol, 4-isooctylphenol, 4-n-nonylphenol, 3-pentadecylphenol, 4-cyclohexylphenol, 4-(1-methyl-1-phenylethyl)phenol, 4-phenylphenol, 4-phenoxyphenol, 4-(1-naphthyl)phenol, 4-(2-naphthyl)phenol, 4-tritylphenol, methyl salicylate, ethyl salicylate, n-propyl salicylate, isopropyl salicylate, n-butyl salicylate, isobutyl salicylate, tert-butyl salicylate, phenyl salicylate and benzyl salicylate.

Preference is given to 4-tert-butylphenol, 4-isooctylphenol and 3-pentadecylphenol.

Suitable branching agents include compounds having three or more functional groups, preferably those having three or more hydroxyl groups.

Suitable compounds having three or more phenolic hydroxyl groups are, for example, phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri(4-hydroxyphenyl)phenylmethane, 2,2-bis(4,4-bis(4-hydroxyphenyl)cyclohexyl]propane, 2,4-bis(4-hydroxyphenylisopropyl)phenol and tetra(4-hydroxyphenyl)methane.

Other suitable compounds having three or more functional groups are, for example, 2,4-dihydroxybenzoic acid, trimesic acid/trimesoyl trichloride, cyanuric trichloride and 3,3-bis(3-methyl-4-hydroxyphenyl)-2-oxo-2,3-dihydroindole.

Preferred branching agents are 3,3-bis(3-methyl-4-hydroxyphenyl)-2-oxo-2,3-dihydroindole and 1,1,1-tri(4-hydroxyphenyl)ethane.

In one embodiment at least one layer (i) or (ii) comprises a thermoplastic material comprising
a) at least one or more poly- or copolycondensate(s) of an aromatic and/or cycloalkyldicarboxylic acid and aliphatic, cycloaliphatic and/or aralphatic diols having 2 to 16 carbon atoms, wherein the poly- or copolycondensate(s) of an aromatic and/or cycloalkyldicarboxylic acid and aliphatic, cycloaliphatic and/or aralphatic diols having 2 to 16 carbon atoms comprise a proportion of 1,4-cyclohexanedimethanol, 1,3-cyclohexanedimethanol and/or 2,2,4,4-tetramethyl-1,3-cyclobutanediol in a range from ≥20 to ≤80 mol % based on the diol component,
a) a blend of at least one or more poly- or copolycondensate(s) of an aromatic and/or cycloalkyldicarboxylic acid and aliphatic, cycloaliphatic and/or aralphatic diols having 2 to 16 carbon atoms with one or more poly- or copolycarbonate(s), wherein the proportion of poly- or copolycarbonate(s) in this blend is in a range from ≥50% to ≤90% by weight and wherein the poly- or copolycondensate(s) of an aromatic and/or cycloalkyldicarboxylic acid and aliphatic, cycloaliphatic and/or aralphatic diols having 2 to 16 carbon atoms comprise a proportion of 1,4-cyclohexanedimethanol, 1,3-cyclohexanedimethanol and/or 2,2,4,4-tetramethyl-1,3-cyclobutanediol in a range from ≥20 to ≤80 mol %, preferably in a range from ≥25 to ≤75 mol %, particularly preferably in a range from ≥25 to ≤70 mol %, based on the diol component, or
b) a blend of poly- or copolycarbonates containing difunctional carbonate structural units of formula (II)

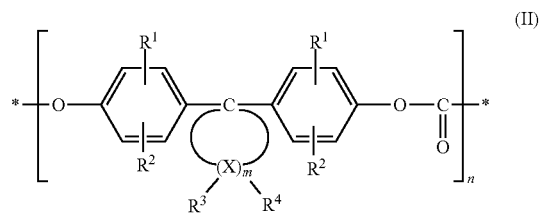

(II)

wherein
$R^1$ and $R^2$ independently of one another represent hydrogen, halogen, preferably chlorine or bromine, $C_1$-$C_8$-alkyl, $C_5$-$C_6$-cycloalkyl, $C_6$-$C_{10}$-aryl, preferably phenyl, and $C_7$-$C_{12}$-aralkyl, preferably phenyl-$C_1$-$C_4$-alkyl, in particular benzyl,
m is an integer from 4 to 7, preferably 4 or 5,
$R^3$ and $R^4$ individually selectable for each X independently of one another represent hydrogen or $C_1$-$C_6$-alkyl,
X represents carbon and
n is an integer greater than 20,
with the proviso that for at least one atom X, $R^3$ and $R^4$ both represent alkyl.

In one embodiment of the invention at least one layer (i) comprises at least one or more poly- or copolycondensate(s) of an aromatic and/or cycloalkyldicarboxylic acid and aliphatic, cycloaliphatic and/or aralphatic diols having 2 to 16 carbon atoms, wherein the poly- or copolycondensate(s) of an aromatic and/or cycloalkyldicarboxylic acid preferably selected from the group of orthophthalic acid, terephthalic acid, isophthalic acid, tert-butylisophthalic acid, 3,3'-diphenyldicarboxylic acid, 4,4'-diphenyldicarboxylic acid, 4,4-benzophenonedicarboxylic acid, 3,4'-benzophenonedicarboxylic acid, 4,4'-diphenyl ether dicarboxylic acid, 4,4'-diphenylsulfonedicarboxylic acid, 2,2-bis(4-carboxyphenyl)propane, trimethyl-3-phenylindane-4,5'-dicarboxylic acid, naphthalene-1,4-dicarboxylic acid, naphthalene-1,5-dicarboxylic acid, naphthalene-2,6-dicarboxylic acid and/or cyclohexanedicarboxylic acid or the reactive derivatives of the recited dicarboxylic acids, preferably terephthalic acid, naphthalene-1,4-dicarboxylic acid, naphthalene-1,5-dicarboxylic acid, naphthalene-2,6-dicarboxylic acid and/or isophthalic acid or the reactive derivatives of the recited dicarboxylic acids, particularly preferably terephthalic acid and/or isophthalic acid or their reactive derivatives and very particularly preferably terephthalic acid or a reactive derivative of terephthalic acid, and aliphatic, cycloaliphatic and/or araliphatic diols having 2 to 16 carbon atoms comprise a proportion of 1,4-cyclohexanedimethanol, 1,3-cyclohexanedimethanol and/or 2,2,4,4-tetramethyl-1,3-cyclobutanediol in a range from ≥20 to ≤80 mol % based on the diol component and the at least one further layer (ii) preferably comprises polycarbonates or copolycarbonates based on diphenols, poly- or copolyacrylates and poly- or copolymethacrylates, for example and preferably polymethyl methacrylate (PMMA), poly- or copolymers with styrene, for example and preferably polystyrene (PS) or polystyrene acrylonitrile (SAN), thermoplastic polyurethanes and polyolefins, for example and preferably, polypropylene types or polyolefins based on cyclic olefins (for example TOPAS™), poly- or copolycondensates of an aromatic dicarboxylic acid and aliphatic, cycloalophatic and/or araliphatic diols having 2 to 16 carbon atoms, for example and preferably poly- or copolycondensates of terephthalic acid, particularly preferably poly- or copolyethylene terephthalate (PET or CoPET), glycol-modified PET (PETG), glycol-modified poly- or copolycyclohexanedimethylene terephthalate (PCTG) or poly- or copolybutylene terephthalate (PBT or CoPBT), preferably poly- or copolycondensates of naphthalenedicarboxylic acid, particularly preferably polyethylene glycol naphthalate (PEN), poly- or copolycondensate(s) of at least one cycloalkyldicarboxylic acid, for example and preferably polycyclohexanedimethanolcyclohexanedicarboxylic acid (PCCD), polysulfones (PSU), polyvinyl halides, for example and preferably polyvinyl chloride (PVC), or mixtures of the abovementioned, particularly preferably polycarbonates or copolycarbonates based on diphenols, poly- or copolyacrylates and poly- or copolymethacrylates, for example polymethyl methacrylate (PMMA), poly- or copolycondensates of terephthalic acid, for example poly- or copolyethylene terephthalate (PET or CoPET), glycol-modified PET (PETG), glycol-modified poly- or copolycyclohexanedimethylene terephthalate (PCTG), poly- or copoly-butylene terephthalate (PBT or CoPBT), poly- or copolycondensates of naphthalenedicarboxylic acid, for example polyethylene glycol naphthalate (PEN), polyvinyl halides, for example polyvinyl chloride (PVC), very particularly preferably at least one polycarbonate or copolycarbonate. In this embodiment the embossed hologram is preferably applied in the form of a transfer embossed hologram such that the nanostructure of the embossed hologram points in the direction of the layer (i). The layers (i) and (ii) may also be transposed.

In another embodiment of the invention at least one layer (i) comprises at least one blend of at least one or more poly- or copolycondensate(s) of an aromatic and/or cycloalkyldicarboxylic acid, preferably selected from the group of orthophthalic acid, terephthalic acid, isophthalic acid, tert-butylisophthalic acid, 3,3'-diphenyldicarboxylic acid, 4,4'-diphenyldicarboxylic acid, 4,4-benzophenonedicarboxylic acid, 3,4'-benzophenonedicarboxylic acid, 4,4'-diphenyl ether dicarboxylic acid, 4,4'-diphenylsulfonedicarboxylic acid, 2,2-bis(4-carboxyphenyl)propane, trimethyl-3-phenylindane-4,5'-dicarboxylic acid, naphthalene-1,4-dicarboxylic acid, naphthalene-1,5-dicarboxylic acid, naphthalene-2,6-dicarboxylic acid and/or cyclohexanedicarboxylic acid or the reactive derivatives of the recited dicarboxylic acids, preferably terephthalic acid, naphthalene-1,4-dicarboxylic acid, naphthalene-1,5-dicarboxylic acid, naphthalene-2,6-dicarboxylic acid and/or isophthalic acid or the reactive derivatives of the recited dicarboxylic acids, particularly preferably terephthalic acid and/or isophthalic acid or their reactive derivatives and very particularly preferably terephthalic acid or a reactive derivative of terephthalic acid, and aliphatic, cycloaliphatic and/or araliphatic diols having 2 to 16 carbon atoms with one or more poly- or copolycarbonate(s), wherein the proportion of poly- or copolycarbonate(s) in this blend is in a range from ≥0% to ≤90% by weight, preferably ≥0% to ≤80% by weight, and wherein the poly- or copolycondensate(s) of an aromatic and/or cycloalkyldicarboxylic acid, preferably orthophthalic acid, terephthalic acid, isophthalic acid, tert-butylisophthalic acid, 3,3'-diphenyldicarboxylic acid, 4,4'-diphenyldicarboxylic acid, 4,4-benzophenonedicarboxylic acid, 3,4'-benzophenonedicarboxylic acid, 4,4'-diphenyl ether dicarboxylic acid, 4,4'-diphenylsulfonedicarboxylic acid, 2,2-bis(4-carboxyphenyl)propane, trimethyl-3-phenylindane-4,5'-dicarboxylic acid, naphthalene-1,4-dicarboxylic acid, naphthalene-1,5-dicarboxylic acid, naphthalene-2,6-dicarboxylic acid and/or cyclohexanedicarboxylic acid or the reactive derivatives of the recited dicarboxylic acids, preferably terephthalic acid, naphthalene-1,4-dicarboxylic acid, naphthalene-1,5-dicarboxylic acid, naphthalene-2,6-dicarboxylic acid and/or isophthalic acid or the reactive derivatives of the recited dicarboxylic acids, particularly preferably terephthalic acid and/or isophthalic acid or their reactive derivatives and very particularly preferably terephthalic acid or a reactive derivative of terephthalic acid, and aliphatic, cycloaliphatic and/or araliphatic diols having 2 to 16 carbon atoms comprise a proportion of 1,4-cyclohexanedimethanol, 1,3-cyclohexanedimethanol and/or 2,2,4,4-tetramethyl-1,3-cyclobutanediol in a range from ≥20 to ≤80 mol %, preferably in a range from ≥25 to ≤75 mol %, particularly preferably in a range from ≥25 to ≤70 mol %, based on the diol component and the at least one further layer (ii) preferably comprises polycarbonates or copolycarbonates based on diphenols, poly- or copolyacrylates and poly- or copolymethacrylates, for example and preferably polymethyl methacrylate (PMMA), poly- or copolymers with styrene, for example and preferably polystyrene (PS) or polystyrene acrylonitrile (SAN), thermoplastic polyurethanes and polyolefins, for example and preferably, polypropylene types or polyolefins based on cyclic olefins (for example TOPAS™), poly- or copolycondensates of an aromatic dicarboxylic acid and aliphatic, cycloalophatic and/or araliphatic diols having 2 to 16 carbon atoms, for example and preferably poly- or copolycondensates of terephthalic acid, particularly preferably poly- or copolyethylene terephthalate (PET or CoPET), glycol-modified PET (PETG), glycol-modified poly- or copolycyclohexanedimethylene terephthalate (PCTG) or poly- or copolybutylene terephthalate (PBT or CoPBT), preferably poly- or copolycondensates of naphthalenedicarboxylic acid, particularly preferably polyethylene glycol naphthalate (PEN), poly- or copolycondensate(s) of at least one cycloalkyldicarboxylic acid, for example and preferably polycyclohexanedimethanolcyclohexanedicarboxylic acid (PCCD), polysulfones (PSU), polyvinyl halides, for example and preferably polyvinyl chloride (PVC), or mixtures of the abovementioned, particularly preferably polycarbonates or copolycarbonates based on diphenols, poly- or copolyacrylates and poly- or copolymethacrylates, for example polymethyl methacrylate (PMMA), poly- or copolycondensates of terephthalic acid, for example poly- or copolyethylene terephthalate (PET or CoPET), glycol-modified PET (PETG), glycol-modified poly- or copolycyclohexanedimethylene terephthalate (PCTG), poly- or copolybutylene terephthalate (PBT or CoPBT), poly- or copolycondensates of naphthalenedicarboxylic acid, for example polyethylene glycol naphthalate (PEN), polyvinyl halides, for example polyvinyl chloride (PVC), very particularly preferably at least one polycarbonate or copolycarbonate. In this embodiment the embossed hologram is preferably applied in the form of a transfer embossed hologram such that the nanostructure of the embossed hologram points in the direction of the layer (i). The layers (i) and (ii) may also be transposed.

In a further embodiment of the invention at least one layer (i) comprises at least one blend of poly- or copolycarbonates containing difunctional carbonate structural units of formula (II)

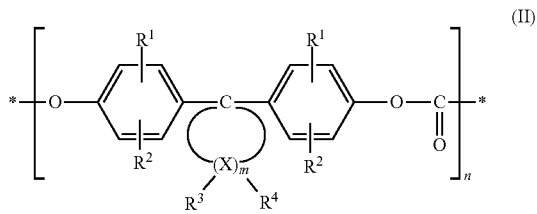

wherein
$R^1$ and $R^2$ independently of one another represent hydrogen, halogen, preferably chlorine or bromine, $C_1$-$C_8$-alkyl, $C_5$-$C_6$-cycloalkyl, $C_6$-$C_{10}$-aryl, preferably phenyl, and $C_7$-$C_{12}$-aralkyl, preferably phenyl-$C_1$-$C_4$-alkyl, in particular benzyl,
m is an integer from 4 to 7, preferably 4 or 5
$R^3$ and $R^4$ individually selectable for each X independently of one another represent hydrogen or $C_1$-$C_6$-alkyl,
X represents carbon and
n is an integer greater than 20,
with the proviso that for at least one atom X, $R^3$ and $R^4$ both represent alkyl, preferably methyl, and the at least one further layer (ii) preferably comprises polycarbonates or copolycarbonates based on diphenols, poly- or copolyacrylates and poly- or copolymethacrylates, for example and preferably polymethyl methacrylate (PMMA), poly- or copolymers with styrene, for example and preferably polystyrene (PS) or polystyrene acrylonitrile (SAN), thermoplastic polyurethanes and polyolefins, for example and preferably, polypropylene types or polyolefins based on cyclic olefins (for example TOPAS™), poly- or copolycondensates of an aromatic dicarboxylic acid and aliphatic, cycloalophatic and/or araliphatic diols having 2 to 16 carbon atoms, for example and preferably poly- or copolycondensates of terephthalic acid, particularly preferably poly- or copolyethylene terephthalate (PET or CoPET), glycol-modified PET (PETG), glycol-modified poly- or copolycyclohexanedimethylene terephthalate (PCTG) or poly- or copolybutylene terephthalate (PBT or CoPBT), preferably poly- or copolycondensates of naphthalenedicarboxylic acid, particularly preferably polyethylene glycol naphthalate (PEN), poly- or copolycondensate(s) of at least one cycloalkyldicarboxylic acid, for example and preferably polycyclohexanedimethanolcyclohexanedicarboxylic acid (PCCD), polysulfones (PSU), polyvinyl halides, for example and preferably polyvinyl chloride (PVC), or mixtures of the abovementioned, particularly preferably polycarbonates or copolycarbonates based on diphenols, poly- or copolyacrylates and poly- or copolymethacrylates, for example polymethyl methacrylate (PMMA), poly- or co-polycondensates of terephthalic acid, for example poly- or copolyethylene terephthalate (PET or CoPET), glycol-modified PET (PETG), glycol-modified poly- or copolycyclohexanedimethylene terephthalate (PCTG), poly- or copolybutylene terephthalate (PBT or CoPBT), poly- or copolycondensates of naphthalenedicarboxylic acid, for example polyethylene glycol naphthalate (PEN), polyvinyl halides, for example polyvinyl chloride (PVC), very particularly preferably at least one polycarbonate or copolycarbonate. In this embodiment the embossed hologram may be applied directly to the layer (i) with a suitable embossing stamp. The layers (i) and (ii) may also be transposed.

In a further embodiment of the invention at least one layer (i) comprises at least one blend of poly- or copolycarbonates containing difunctional carbonate structural units of formula (II) wherein for one to two atoms X, in particular for only one atom X, R3 and R4 both represent alkyl, in particular methyl, and the at least one further layer (ii) preferably comprises polycarbonates or copolycarbonates based on diphenols, poly- or copolyacrylates and poly- or copolymethacrylates, for example and preferably polymethyl methacrylate (PMMA), poly- or copolymers with styrene, for example and preferably polystyrene (PS) or polystyrene acrylonitrile (SAN), thermoplastic polyurethanes and polyolefins, for example and preferably, polypropylene types or polyolefins based on cyclic olefins (for example TOPAS™), poly- or copolycondensates of an aromatic dicarboxylic acid and aliphatic, cycloalophatic and/or araliphatic diols having 2 to 16 carbon atoms, for example and preferably poly- or copolycondensates of terephthalic acid, particularly preferably poly- or copolyethylene terephthalate (PET or CoPET), glycol-modified PET (PETG), glycol-modified poly- or copolycyclohexanedimethylene terephthalate (PCTG) or poly- or copolybutylene terephthalate (PBT or CoPBT), preferably poly- or copolycondensates of naphthalenedicarboxylic acid, particularly preferably polyethylene glycol naphthalate (PEN), poly- or copolycondensate(s) of at least one cycloalkyldicarboxylic acid, for example and preferably polycyclohexanedimethanolcyclohexanedicarboxylic acid (PCCD), polysulfones (PSU), polyvinyl halides, for example and preferably polyvinyl chloride (PVC), or mixtures of the abovementioned, particularly preferably polycarbonates or copolycarbonates based on diphenols, poly- or copolyacrylates and poly- or copolymethacrylates, for example polymethyl methacrylate (PMMA), poly- or co-polycondensates of terephthalic acid, for example poly- or copolyethylene terephthalate (PET or CoPET), glycol-modified PET (PETG), glycol-modified poly- or copolycyclohexanedimethylene terephthalate (PCTG), poly- or copolybutylene terephthalate (PBT or CoPBT), poly- or copolycondensates of naphthalenedicarboxylic acid, for example polyethylene glycol naphthalate (PEN), polyvinyl halides, for example polyvinyl chloride (PVC), very particularly preferably at least one polycarbonate or copolycarbonate. In this embodiment the embossed hologram may be applied directly to the layer (i) with a suitable embossing stamp. The layers (i) and (ii) may also be transposed.

In a further embodiment of the invention at least one layer (i) comprises at least one blend of poly- or copolycarbonates containing difunctional carbonate structural units of formula (II) wherein for one to two atoms X, in particular for only one atom X, $R^3$ and $R^4$ both represent alkyl, in particular methyl, and the at least one further layer (ii) preferably comprises polycarbonates or copolycarbonates based on diphenols, poly- or copolyacrylates and poly- or copolymethacrylates, for example and preferably polymethyl methacrylate (PMMA), poly- or copolymers with styrene, for example and preferably polystyrene (PS) or polystyrene acrylonitrile (SAN), thermoplastic polyurethanes and polyolefins, for example and preferably, polypropylene types or polyolefins based on cyclic olefins (for example TOPAS™), poly- or copolycondensates of an aromatic dicarboxylic acid and aliphatic, cycloalophatic and/or araliphatic diols having 2 to 16 carbon atoms, for example and preferably poly- or copolycondensates of terephthalic acid, particularly preferably poly- or copolyethylene terephthalate (PET or CoPET), glycol-modified PET (PETG), glycol-modified poly- or copolycyclohexanedimethylene terephthalate (PCTG) or poly- or copolybutylene terephthalate (PBT or CoPBT), preferably poly- or copolycondensates of naphthalenedicarboxylic acid, particularly preferably polyethylene glycol naphthalate (PEN), poly- or copolycondensate(s) of at least one cycloalkyldicarboxylic acid, for example and preferably polycyclohexanedimethanolcyclohexanedicarboxylic acid (PCCD), polysulfones (PSU), polyvinyl halides, for example and preferably polyvinyl chloride (PVC), or mixtures of the abovementioned, particularly preferably polycarbonates or copolycarbonates based on diphenols, poly- or copolyacrylates and poly- or copolymethacrylates, for example polymethyl methacrylate (PMMA), poly- or copolycondensates of terephthalic acid, for example poly- or copolyethylene terephthalate (PET or CoPET), glycol-modified PET (PETG), glycol-modified poly- or copolycyclohexanedimethylene terephthalate (PCTG), poly- or copolybutylene terephthalate (PBT or CoPBT), poly- or copolycondensates of naphthalenedicarboxylic acid, for example polyethylene glycol naphthalate (PEN), polyvinyl halides, for example polyvinyl chloride (PVC), very particularly preferably at least one polycarbonate or copolycarbonate. In this embodiment the embossed hologram may be applied directly to the layer (i) with a suitable embossing stamp. The layers (i) and (ii) may also be transposed.

In a further embodiment of the invention the blend of poly- or copolycarbonates containing difunctional carbonate structural units of formula (II) comprises the difunctional carbonate structural units of formula (II) in an amount of 2% by mass to 60% by mass, preferably of 5% by mass to 55% by mass, particularly preferably of 10% by mass to 55% by mass, and the at least one further layer (ii) preferably comprises polycarbonates or copolycarbonates based on diphenols, poly- or copolyacrylates and poly- or copolymethacrylates, for example and preferably polymethyl methacrylate (PMMA), poly- or copolymers with styrene, for example and preferably polystyrene (PS) or polystyrene acrylonitrile (SAN), thermoplastic polyurethanes and polyolefins, for example and preferably, polypropylene types or polyolefins based on cyclic olefins (for example TOPAS™), poly- or copolycondensates of an aromatic dicarboxylic acid and aliphatic, cycloalophatic and/or araliphatic diols having 2 to 16 carbon atoms, for example and preferably poly- or copolycondensates of terephthalic acid, particularly preferably poly- or copolyethylene terephthalate (PET or CoPET), glycol-modified PET (PETG), glycol-modified poly- or copolycyclohexanedimethylene terephthalate (PCTG) or poly- or copolybutylene terephthalate (PBT or CoPBT), preferably poly- or copolycondensates of naphthalenedicarboxylic acid, particularly preferably polyethylene glycol naphthalate (PEN), poly- or copolycondensate(s) of at least one cycloalkyldicarboxylic acid, for example and preferably polycyclohexanedimethanolcyclohexanedicarboxylic acid (PCCD), polysulfones (PSU), polyvinyl halides, for example and preferably polyvinyl chloride (PVC), or mixtures of the abovementioned, particularly preferably polycarbonates or copolycarbonates based on diphenols, poly- or copolyacrylates and poly- or copolymethacrylates, for example polymethyl methacrylate (PMMA), poly- or copolycondensates of terephthalic acid, for example poly- or copolyethylene terephthalate (PET or CoPET), glycol-modified PET (PETG), glycol-modified poly- or copolycyclohexanedimethylene terephthalate (PCTG), poly- or copolybutylene terephthalate (PBT or CoPBT), poly- or copolycondensates of naphthalenedicarboxylic acid, for example polyethylene glycol naphthalate (PEN), polyvinyl halides, for example polyvinyl chloride (PVC), very particularly preferably at least one polycarbonate or copolycarbonate. In this embodiment the embossed hologram may be applied directly to the layer (i) with a suitable embossing stamp. The layers (i) and (ii) may also be transposed.

In a further embodiment of the at least one layer (i) and/or the at least one further layer (ii) may contain a laser-sensitive additive, preferably a black pigment, particularly preferably carbon black. This embodiment of the invention is also readily amenable to personalization by laser gravure.

The marking of plastic films by laser gravure is referred to as laser marking for short both in the art and hereinbelow. Accordingly the term "laser marked" is hereinbelow to be understood as meaning marked by laser gravure. The process of laser gravure is known to those skilled in the art and is not to be confused with printing using laser printers.

Suitable laser-sensitive additives include for example so-called laser marking additives, i.e. Additives composed of an absorber in the wavelength range of the laser to be employed, preferably in the wavelength range of Nd:YAG lasers (neodymium-doped yttrium aluminum garnet lasers). Such laser marking additives and the use thereof in molding materials are described for example in WO-A 2004/50766 and WO-A 2004/50767 and are commercially available from DSM under the brand name Micabs™. Absorbers likewise suitable as laser-sensitive additives are carbon black and phosphorus-containing tin-copper mixed oxides such as described in WO-A 2006/042714 for example.

The laser-sensitive additive may be present in the inventive layer (i) and/or (ii) in an amount of 40 to 180 ppm, preferably of 50 to 160 ppm.

The particle size of the laser-sensitive additive is preferably in the range from 100 nm to 10 µm and particularly advantageously in the range from 50 nm to 2 µm.

The optional addition of laser sensitive additives, preferably black pigments, particularly preferably carbon black in the inventive layer (i) and/or (ii) does not impair the improved brightness of the embossed hologram achieved according to the invention.

In the layered structure according to the invention, the at least one layer (i) and the at least one further layer (ii) may each have a layer thickness in the range from $\geq 20$ to $\leq 200$ µm, preferably in the range from $\geq 25$ to $\leq 145$ µm, very particularly preferably in the range from $\geq 30$ to $\leq 120$ µm.

In one embodiment the layers (i) and/or (ii) comprise monofilms and/or multilayer films. According to the invention the layers (i) and/or (ii) may comprise monofilms and/or multilayer films producible by extrusion or coextrusion and comprising the abovementioned thermoplastic polymers. The layers (i) and/or (ii) are preferably monofilms preferably producible by extrusion.

In advantageous embodiments the layers (i) and/or (ii) have differently structured surfaces. One side of the layer (i) and/or (ii) has a roughness R3z of $\geq 0.5$ µm to $\leq 25$ µm, preferably ≥0.5 µm to ≤17 µm, particularly preferably ≥0.5 µm to ≤15 µm. Roughness R3z is determined according to ISO 4287/88. The embossed hologram is preferably applied to the side of the layer (i) and/or (ii) having a roughness R3z of ≥0.5 µm to ≤25 µm, preferably ≥0.5 µm to ≤17 µm, particularly preferably ≥0.5 µm to ≤15 µm.

In another embodiment an adhesive layer may be applied to the nanostructure of the embossed hologram. This makes it possible to improve the adhesion of the individual layers in the laminate. The presence of an adhesive layer on the nanostructure of the embossed hologram has no effect on the color and shape of the embossed hologram. Suitable adhesives include all of the heat-activatable adhesives known to those skilled in the art. Heat-activatable adhesives, also known as "heat seal adhesives" form non-blocking coatings on substrates at room temperature. Activation is effected by heating and joining is carried out under simultaneous exertion of pressure. Heat-activatable adhesives are generally provided based on polyurethane, polyolefins, polyvinylidene chloride, polyvinyl acetate and polyacrylate as a dispersion or in an organic solvent.

Processing is very similar to that of hotmelt adhesives: Heating until softening of the adhesive layer, usually together with the second joining partner, activates the adhesive. Once wetting has occurred cohesion is built up by cooling under pressure.

The layered structure may optionally comprise further layers of at least one thermoplastic material. For the avoidance of repetition reference is made here to the description and preferred embodiments of the thermoplastic material described hereinabove for the layers (i) and (ii).

These optional further layers may be single-layer or multilayer films which may additionally comprise a filler for example. The filler is preferably at least one color pigment and/or at least one other filler for producing a translucence of the filled layers, particularly preferably a white pigment, very particularly preferably titanium dioxide, zirconium dioxide or barium sulfate and in a preferred embodiment titanium dioxide.

The filling of a further layer in the layered structure according to the invention with at least one such filler further improves the visibility of the incorporated marking/image(s), thus also further improving the perception of improved sharpness and resolution.

The recited fillers are preferably added in amounts of 2% to 45% by weight, particularly preferably of 5% to 30% by weight, based on the total weight of the layer containing the filler which may be produced for example by extrusion or coextrusion.

The inventive layers (i) and (ii) preferably comprise no filler and the inventive layers (i) and (ii) are particularly preferably transparent. Transparent is to be understood as meaning a light transmission ≥75% (determined according to ISO 13468-2).

The layer thickness of the further layers optionally present in the layered structure according to the invention may each have a thickness in the range from ≥20 to ≤700 µm, preferably in the range from ≥25 to ≤250 µm, very particularly preferably in the range from ≥30 to ≤120 µm.

The invention further provides a process for producing a layered structure as described hereinabove, comprising the steps of a) applying at least one embossed hologram to a layer (i) or (ii) in such a way that the nanostructure of the at least one embossed hologram points in the direction of the layer having the lower softening temperature, wherein the layers (i) or (ii) each comprise a thermoplastic material and wherein the vicat softening temperature B/50 determined according to ISO 306 (50N; 50°/h) of the layer (i) is ≥3° C. to ≤45° C., preferably ≥10° C. to ≤40° C., particularly preferably ≥15° C. to ≤30° C., higher or lower than the vicat softening temperature B/50 of the layer (ii), b) optionally providing one or more further layers of a thermoplastic material, preferably polycarbonates or copolycarbonates based on diphenols, poly- or copolyacrylates and poly- or copolymethacrylates, for example and preferably polymethyl methacrylate (PMMA), poly- or copolymers with styrene, for example and preferably polystyrene (PS) or polystyrene acrylonitrile (SAN), thermoplastic polyurethanes and polyolefins, for example and preferably, polypropylene types or polyolefins based on cyclic olefins (for example TOPAS™), poly- or copolycondensates of an aromatic dicarboxylic acid and aliphatic, cycloaliphatic and/or araliphatic diols having 2 to 16 carbon atoms, for example and preferably poly- or copolycondensates of terephthalic acid, particularly preferably poly- or copolyethylene terephthalate (PET or CoPET), glycol-modified PET (PETG), glycol-modified poly- or copolycyclohexanedimethylene terephthalate (PCTG) or poly- or copolybutylene terephthalate (PBT or CoPBT), preferably poly- or copolycondensates of naphthalenedicarboxylic acid, particularly preferably polyethylene glycol naphthalate (PEN), poly- or copolycondensate(s) of at least one cycloalkyldicarboxylic acid, for example and preferably polycyclohexanedimethanolcyclohexanedicarboxylic acid (PCCD), polysulfones (PSU), polyvinyl halides, for example and preferably polyvinyl chloride (PVC), or mixtures of the abovementioned, particularly preferably polycarbonates or copolycarbonates based on diphenols, poly- or copolyacrylates and poly- or copolymethacrylates, for example polymethyl methacrylate (PMMA), poly- or copolycondensates of terephthalic acid, for example poly- or copolyethylene terephthalate (PET or CoPET), glycol-modified PET (PETG), glycol-modified poly- or copolycyclohexanedimethylene terephthalate (PCTG), poly- or copolybutylene terephthalate (PBT or CoPBT), poly- or copolycondensates of naphthalenedicarboxylic acid, for example polyethylene glycol naphthalate (PEN), polyvinyl halides, for example polyvinyl chloride (PVC).

c) placing the layers (i) and (ii) at the desired position in the layered structure, wherein the layers (i) and (ii) preferably form outer layers of the layered structure which may optionally be provided with a further protective layer of a thermoplastic material.

d) laminating the layered structure at a temperature of 120° C. to 210° C., preferably of 130° C. to 205° C., particularly preferably of 150° C. to 200° C., and a pressure of 10 N/cm² to 400 N/cm², preferably of 30 N/cm² to 300 N/cm², particularly preferably of 40 N/cm² to 250 N/cm².

The laminating of the layered structure, which comprises for example a stack of two or more plastic films, preferably three to fifteen plastic films, may be carried out according to known methods. The layered structure may have white plastic films placed in the middle plies and transparent plastic films placed in the outer plies and preferably these outer plies comprise at least one layer (i) comprising a thermoplastic material and at least one further layer (ii) comprising a thermoplastic material, characterized in that the vicat softening temperature B/50 determined according to ISO 306 (50N; 50°/h) of the layer (i) is ≥3° C. to ≤45° C., preferably ≥10° C. to ≤40° C., particularly preferably ≥15° C. to ≤30° C., higher or lower than the softening temperature of the layer (ii) and in that at least one embossed hologram is applied to the layer (i) or (ii) such that the nanostructure of the at least one embossed hologram points in the direction of the layer having the lower softening temperature. A further transparent plastic film for protection of the embossed hologram of the layers (i) and (ii) may optionally be placed thereupon to protect the embossed hologram. This stack of plastic films is usually aligned, fixed and pressed in a laminating press under the action of heat and pressure for a certain period of time, thus forming a monolithic composite of the film layers, a so-called laminate.

In one embodiment only the inventive layers (i) and (ii) may be laminated as described hereinabove.

The present invention further provides a security document, preferably an identification document, containing the above described layered structure according to the invention.

The security document, preferably identification document, according to the invention may comprise further additional layers by means of which for example further information may be introduced into the security document, preferably identification document.

Such additional information may be for example personalizing portraits or non-personalizing general information contained in the same form in every security document, preferably identification document, of the same type.

Such layers may be for example introduced into the security document, preferably identification document, from films previously imparted with this information by means of conventional printing processes, preferably inkjet or laser printing, particularly preferably color printing, Inkjet-printable films are known per se to those skilled in the art and may be films comprising the abovementioned thermoplastic materials. In particularly preferred embodiments plastic films colored white or translucent using fillers such as for example titanium dioxide, zirconium dioxide, barium sulfate etc. are employed for better legibility of the printed information.

Films suitable for printing by laser printing, in particular by color laser printing, are those comprising the above described thermoplastic materials, in particular those having a specific surface resistance of $10^7$ to $10^{13}\Omega$, preferably of $10^8$ to $10^{12}\Omega$. Specific surface resistance in $\Omega$ is determined according to DIN IEC 60093 (1993).

Such films may preferably be films where prior to film production the plastic has been admixed for example with an additive selected from tertiary or quaternary, preferably quaternary ammonium or phosphonium salts, of a partially or perfluorinated organic acid or quaternary ammonium or phosphonium hexafluorophosphates, preferably a partially or perfluorinated alkylsulfonic acid, preferably a perfluoroalkylsulfonic acid, to achieve the specific surface resistance. These additives may also be present in the inventive layers (i) and/or (ii).

Preferred suitable quaternary ammonium or phosphonium salts are:
tetrapropylammonium perfluorooctanesulfonate,
tetrapropylammonium perfluorobutanesulfonate,
tetrabutylammonium perfluorooctanesulfonate,
tetrabutylammonium perfluorobutanesulfonate,
tetrapentylammonium perfluoroctanesulfonate
tetrapentylammonium perfluorobutanesulfonate
tetrahexylammonium perfluoroctanesulfonate
tetrahexylammonium perfluorobutanesulfonate
trimethylneopentylammonium perfluorobutanesulfonate
trimethylneopentylammonium perfluorooctanesulfonate
dimethyldineopentylammonium perfluorobutanesulfonate
dimethyldineopentylammonium perfluorooctanesulfonate
N-methyltripropylammonium perfluorobutylsulfonate,
N-ethyltripropylammonium perfluorobutylsulfonate,
tetrapropylammonium perfluorobutylsulfonate,
diisopropyldimethylammonium perfluorobutylsulfonate,
diisopropyldimethylammonium perfluorooctylsulfonate,
N-methyltributylammonium perfluorooctylsulfonate,
cyclohexyldiethylmethylammonium perfluorooctylsulfonate,
cyclohexyltrimethylammonium perfluorooctylsulfonate
and the corresponding phosphonium salts. The ammonium salts are preferred.

It is also possible to employ one or more of the abovementioned quaternary ammonium or phosphonium salts, i.e. also mixtures.

Very particular preference is given to tetrapropylammonium perfluorooctanesulfonate, tetrabutylammonium perfluorooctanesulfonate, tetrapentylammonium perfluorooctanesulfonate, tetrahexylammonium perfluorooctanesulfonate and dimethyldiisopropylammonium perfluorooctanesulfonate and the corresponding perfluorobutanesulfonate salts.

In a very particularly preferred embodiment dimethyldiisopropylammonium perfluorobutanesulfonate may be used as an additive.

The recited salts are known or are producible by known methods. The salts of the sulfonic acids are preparable for example by combination of equimolar amounts of the free sulfonic acid with the hydroxyl form of the corresponding cation in water at room temperature and concentration of the solution. Other production processes are described for example in DE-A 1 966 931 and NL-A 7 802 830.

The recited salts are preferably added to the thermoplastic materials in amounts of 0.001% to 2% by weight, preferably of 0.1% to 1% by weight, before shaping to afford the film according to the invention which may be carried out for example by extrusion or coextrusion.

The invention further provides a laminate comprising the layered structure according to the invention The invention further provides for the use of a layer (i) comprising a thermoplastic material and at least one further layer (ii) comprising a thermoplastic material, characterized in that the vicat softening temperature B/50 determined according to ISO 306 (50N; 50°/h) of the layer (i) is ≥3° C. to ≤45° C., preferably ≥10° C. to ≤40° C., particularly preferably ≥15° C. to ≤30° C., higher or lower than the softening temperature of the layer (ii), for applying at least one embossed hologram, wherein the nanostructure of the at least one embossed hologram points in the direction of the layer having the lower softening temperature.

The invention further provides for the use of at least one layer (i) comprising a thermoplastic material and at least one further layer (ii) comprising a thermoplastic material, characterized in that the vicat softening temperature B/50 determined according to ISO 306 (50N; 50°/h) of layer (i) is ≥3° C. to ≤45° C., preferably ≥10° C. to ≤40° C., particularly preferably ≥15° C. to ≤30° C., higher or lower than the softening temperature of layer (ii) and in that at least one embossed hologram is applied to the layer (i) or (ii) such that the nanostructure of the at least one embossed hologram points in the direction of the layer having the lower softening temperature, for producing a layer composite, preferably a laminate.

The examples which follow are intended for exemplary elucidation of the invention and should not be seen as limiting.

EXAMPLES

Raw Materials Employed:

Makrolon™ 3108 (M.3108): high-viscosity, amorphous thermoplastic bisphenol A polycarbonate having an MVR of 6 g/10 min according to ISO 1133 at 300° C. and 1.2 kg from Covestro AG.

Eastar™ DN 010 (DN 010): Poly- or copolycondensate of terephthalic acid composed of 54.9% by weight of terephthalic acid, 9.3% by weight (38 mol % based on diol component) of ethylene glycol and 35.8% by weight (62 mol % based on diol component) of cyclohexane-1,4-dimethanol having an inherent viscosity of 0.74 dl/g (measured in a 1:1 mixture of phenol and tetrachloroethane at 25° C.) from Eastman Chemical Company.

Pocan™ B 1600 (PBT 1600): Unmodified polycondensate of terephthalic acid and 1,4-butanediol as the diol component having a melt volume rate (MVR) of 14 g/10 min according to ISO 1133 at 260° C. and 2.16 kg from Lanxess AG.

Raw Material 1: Production of a Polycarbonate Derivative 205.7 g (0.90 mol) of bisphenol A (2,2-bis(4-hydroxyphenyl)propane), 30.7 g (0.10 mol) of 1,1-bis(4-hydroxyphenyl)-3,3,5-trimethylcyclohexane, 336.6 g (6 mol) of KOH and 2700 g of water are dissolved with stirring in an inert gas atmosphere. A solution of 1.88 g of phenol in 2500 ml of methylene chloride is then added. 198 g (2 mol) of phosgene were introduced into the well-stirred solution at pH 13 to 14 and 21° C. to 25° C. 1 ml of ethylpiperidine is then added and the mixture is stirred for 45 min. The bisphenoxide-free aqueous phase is removed, the organic phase is acidified with phosphoric acid, neutralized by washing with water and freed of solvent.

The polycarbonate derivative A showed a vicat softening temperature B/50 determined according to ISO 306 (50N; 50°/h) of 183° C.

General Production Procedure for Extrusion Films

The employed apparatus consists of an extruder having a screw of 105 mm in diameter (D) and a length of 41×D. The screw has a devolatilization zone;

a crosshead;

an extrusion slot die of 1500 mm in width;

a three-roll smoothing calender with horizontal roller orientation, wherein the third roller can swivel by +/−45° relative to the horizontal;

a roller conveyor;

an apparatus for double-sided application of protective film;

a extraction device;

a winding station.

The pelletized material was supplied to the extruder hopper. Melting and conveying of the material was carried out in the barrel/screw plasticizing system. The melt passed from the die onto the smoothing calender. On the smoothing calender the material is subjected to final shaping and cooling. Structuring of the film surfaces was achieved using a matt steel roller (no. 6 surface) and a finely matted rubber roller (no. 2 surface). The film was then transported through an extraction device before being wound up. The compositions of the films in the examples are described in table 1.

TABLE 1

Composition of extrusion films (examples 1 to 2)

| | Formulation | | Melting temperature | VST/B/50 (ISO 306) |
|---|---|---|---|---|
| Film 1 100 μm monofilm, transparent | M.3108 DN 010 PBT 1600 | 80% 14.3% 5.7% | 260° C. | 126° C. |
| Film 2 100 μm monofilm, transparent | Raw material 1 | 100% | 330° C. | 183° C. |
| Film 3 100 μm monofilm, transparent | M.3108 | 100% | 280° C. | 148° C. |

Film 4: Polyester film having embossed hologram and adhesive layer on the non-embossed side of the polyester film, from Krypten. The total thickness of the film was 23 μm.

Film 5: 22 μm polyester carrier film having a separation layer, having a metal layer and an adhesive layer that is applied to the side of the separation layer. The metal layer is vapor-deposited onto the polyester carrier film having a separation layer by vacuum metallization. The adhesive coating is subsequently applied to the metallized side of the film. The adhesive layer is a 1 μm thin adhesive layer of a heat-activatable adhesive.

Production of Layered Structures

Example 1

Application of the Hologram onto Film 3

Film 4 was glued to the finely matted side (no. 2 side) of film 3 and the nanostructure was applied to film 4 such that this nanostructure faces away from film 3. Film 3 and film 4 were bonded by roller lamination having the following parameters. Temperature of rollers: 150° C.

Pressure: 5 N/cm2

Lamination speed: 1 meter/minute

Layered Structure 1:

Film 1 was placed on the film composite of film 3 and film 4, with its finely matted side (no. 2 side) in contact with film 4 (FIG. 1). This layered structure was laminated in a Bürkle lamination press with the following parameters:

preheating the press to 190° C.

pressing for 4 minutes at a pressure of 15 N/cm$^2$ pressing for 1 minute at a pressure of 200 N/cm$^2$ cooling the press to 38° C., opening the press and removing the laminate.

Example 2 (Comparative)

Figure 2:
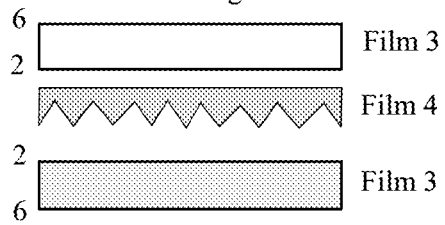
FIG. 2 is a schematic diagram of layered structure 2.

A further layered structure 2 was produced analogously to example 1 but with the exception that film 3 was used instead of film 1 (FIG. 2)

Visual assessment of the laminates 1 and 2 clearly showed that the embossed holograms in the inventive laminate 1 exhibit a better brightness. In addition, the details of the depicted shapes and the light refraction of the embossed hologram were virtually unchanged.

Example 3

Figure 3:
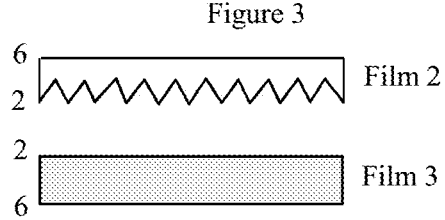
FIG. 3 is a schematic diagram of layered structure 3.

On the finely matted side (no. 2 side) of film 2, nanogravures are embossed into the film surface by hot embossing. Prior to the embossing process a thin metal layer is vapor-deposited onto the embossing stamp in a thickness of just a few nanometers by vacuum metallization. The embossing stamp has a special coating to prevent permanent adhesion of the metal layer to the stamp. At the site at which the embossing is to be effected the film is provided with a thin layer of a heat-activatable adhesive, namely with the adhesive of the type 532380 from Apollo Inks The embossing process of the film is carried out in a vacuum chamber to allow continuous metallization of the embossing stamp and with the following embossing parameters described:
Temperature of embossing stamp: 210° C.
Embossing pressure: 500 N/cm$^2$
Embossing time: 1.5 s.
Layered Structure 3:
Film 3 is placed with its finely matted side (no. 2 side) onto the embossed finely matted side (no. 2 side) of film 2 in contact with film 2 (FIG. 3). The lamination of the layered structure was carried out on a Bürkle lamination press with the following parameters:
preheating the press to 190° C.
   pressing for 4 minutes at a pressure of 15 N/cm$^2$
   pressing for 1 minute at a pressure of 200 N/cm$^2$
   cooling the press to 38° C., opening the press and removing the laminate.

Example 4 (Comparative)

Figure 4:
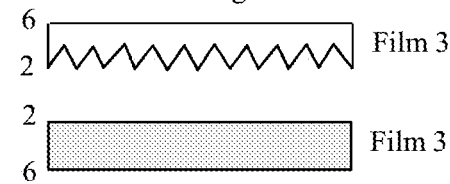
FIG. 4 is a schematic diagram of layered structure 4.

A further layered structure 4 is produced analogously to example 3 but with the exception that film 3 is used instead of film 2 (FIG. 4).

Visual assessment of the laminates 3 and 4 clearly shows that the embossed holograms in the inventive laminate 3 exhibit a better brightness. The details of the depicted shapes and the light refraction of the embossed hologram were virtually unchanged.

Example 5

Film 5 is bonded to the finely matted side (no. 2 side) of film 2 and fixed by roller lamination according to the following parameters:
Temperature of rollers: 150° C.
Pressure: 5 N/cm2
Lamination speed: 1 m/minute
The 22 μm-thick carrier film of film 5 is subsequently removed.

Figure 5:
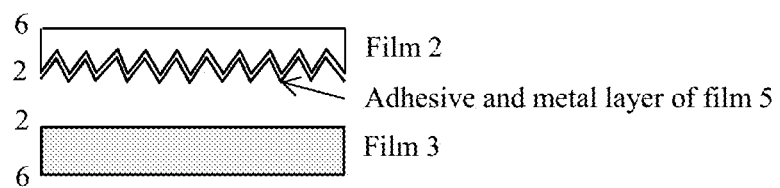
FIG. 5 is a schematic diagram of layered structure 5.

The embossing of the hologram in film 2 is carried out on the side comprising the transferred adhesive and metal layer from film 5 according to the following embossing parameters:
Temperature of embossing stamp: 210° C.
Embossing pressure: 500 N/cm$^2$
Embossing time: 1.5 s.
Layered Structure 5:
Film 3 is placed with its finely matted side (no. 2 side) onto the embossed film 2 in contact with film 5 (FIG. 5). This layered structure is laminated on a Bürkle lamination press with the following parameters:
preheating the press to 190° C.
   pressing for 4 minutes at a pressure of 15 N/cm$^2$
   pressing for 1 minute at a pressure of 200 N/cm$^2$
   cooling the press to 38° C., opening the press and removing the laminate.

Example 6 (Comparative)

Figure 6:
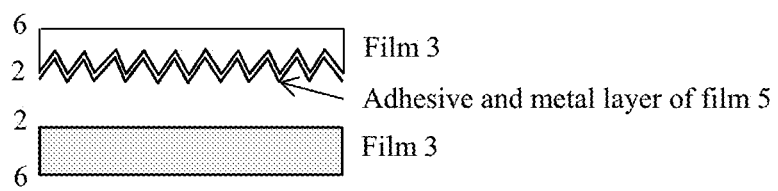
FIG. 6 is a schematic diagram of layered structure 6.

A layered structure 6 is produced analogously to example 5 but with the exception that film 3 is used instead of film 2 (FIG. 6)

Visual assessment of the laminates 5 and 6 clearly shows that the embossed holograms in the inventive laminate 5 exhibit a better brightness. The details of the depicted shapes and the light refraction of the embossed hologram were virtually unchanged.

Example 7

Figure 7:
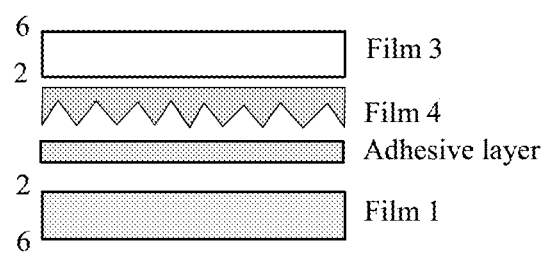
FIG. 7 is a schematic diagram of layered structure 7.

An embossed hologram is applied to film 3 as described at example 1.
Layered Structure 7:
An adhesive layer of the heat-activatable adhesive Chemipearl™ V200 from Mitsui Chemicals was applied by screen printing onto the film composite of film 3 and 4, namely onto the side of the embossed hologram of film 4 in a layer thickness of about 3 μm (FIG. 7). A further film 1 was placed on the adhesive layer so that the finely matted side (no. 2 side) of film 1 was in contact with the adhesive layer. This layered structure was laminated on a Bürkle lamination press with the parameters reported at example 1.

Example 8 (Comparative)

Figure 8:
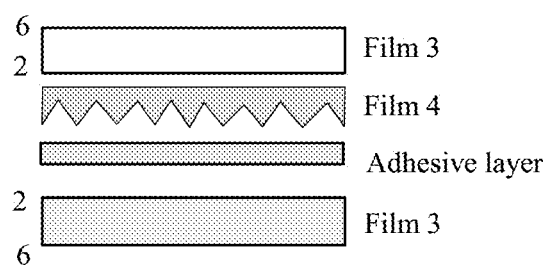
FIG. 8 is a schematic diagram of layered structure 8.

A further layered structure 8 was produced as described at example 7 but with the exception that film 3 was used instead of film 1 (FIG. 8).

Visual assessment of the laminates from examples 7 and 8 clearly showed that the embossed holograms in the inventive laminate from example 7 exhibit a better brightness. In addition, the details of the depicted shapes and the light refraction of the embossed hologram were virtually unchanged. The presence of an adhesive layer between the embossed hologram and the film 1 or 3 has no effect on the appearance of the embossed hologram.

FIGS. 1 to 8 show schematic diagrams of the layered structure of laminates 1 to 8 with the films employed in each case. The numerals on the left-hand side of the individual film layers indicate the surface structure of the corresponding film: Structuring of the film surfaces was achieved using a matt steel roller (no. 6 surface) and a finely matted rubber roller (no. 2 surface).

The invention claimed is:

1. A layered structure containing at least one layer (i) comprising a thermoplastic material and at least one further layer (ii) comprising a thermoplastic material, wherein a vicat softening temperature B/50 of the at least one layer (i) as determined according to ISO 306 at 50N and 50°/h is ≥3° C. to ≤45° C. higher or lower than a vicat softening temperature B/50 of the at least one further layer (ii) and in that at least one embossed hologram is applied to the at least one layer (i) or the at least one further layer (ii) such that a nanostructure of the at least one embossed hologram points in a direction of the layer having the lower vicat softening temperature B/50, wherein the at least one embossed hologram is formed directly in a surface of the at least one layer (i) or the at least one further layer (ii), or wherein the at least one embossed hologram is formed directly in a surface of an additional layer applied between the at least one layer (i) and the at least one further layer (ii), wherein the thermoplastic material of the at least one layer (i) and the at least one further layer (ii) is selected from the group consisting of polycarbonates or copolycarbonates based on diphenols, poly- or copolycondensates of an aromatic dicarboxylic acid and aliphatic, cycloalophatic and/or araliphatic diols having 2 to 16 carbon atoms, glycol-modified polyethylene terephthalate, glycol-modified poly- or copolycyclohexanedimethylene terephthalate, poly- or copolybutylene terephthalate, poly- or copolycondensate(s) of at least one cycloalkyldicarboxylic acid, polysulfones, polyvinyl halides, and mixtures thereof.

2. The layered structure as claimed in claim 1, wherein the at least one layer (i) and/or the at least one further layer (ii) comprise monofilms and/or multilayer films.

3. The layered structure as claimed in claim 1, wherein at least one layer of the at least one layer (i) or the at least one further layer (ii) comprises a thermoplastic material comprising
   a) at least one or more poly- or copolycondensate(s) of an aromatic and/or cycloalkyldicarboxylic acid and aliphatic, cycloaliphatic, and/or araliphatic diols having 2 to 16 carbon atoms, wherein the at least one or more poly- or copolycondensate(s) comprise a proportion of 1,4-cyclohexanedimethanol, 1,3-cyclohexanedimethanol, 2,2,4,4-tetramethyl-1,3-cyclobutanediol, or a combination thereof in a range from ≥20 to ≤80 mol % based on a total amount of the aliphatic, cycloaliphatic, and/or araliphatic diols,
   b) a blend of at least one or more poly- or copolycondensate(s) of an aromatic and/or cycloalkyldicarboxylic acid and aliphatic, cycloaliphatic, and/or araliphatic diols having 2 to 16 carbon atoms with one or more poly- or copolycarbonate(s), wherein the proportion of the one or more poly- or copolycarbonate(s) in the blend is in a range from >0% by weight to ≤90% by weight, and wherein the one or more poly- or copolycondensate(s) comprise a proportion of 1,4-cyclohexanedimethanol, 1,3-cyclohexanedimethanol, 2,2,4,4-tetramethyl-1,3-cyclobutanediol, or a combination thereof in a range from ≥20 to ≤80 mol %, based on a total amount of aliphatic, cycloaliphatic, and/or araliphatic diols,
   or
   c) a blend of poly- or copolycarbonates containing difunctional carbonate structural units of formula (II)

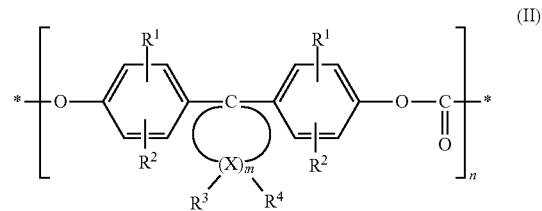

wherein
   $R^1$ and $R^2$ independently of one another represent hydrogen, halogen, $C_1$-$C_8$-alkyl, $C_5$-$C_6$-cycloalkyl, $C_6$-$C_{10}$-aryl, and $C_7$-$C_{12}$-aralkyl,
   m is an integer from 4 to 7,
   $R^3$ and $R^4$ individually selectable for each X independently of one another represent hydrogen or $C_1$-$C_6$-alkyl,
   X represents carbon and
   n is an integer greater than 20,
   with the proviso that for at least one atom X, $R^3$ and $R^4$ both represent $C_1$-$C_6$-alkyl.

4. The layered structure as claimed in claim 1, wherein the at least one layer (i) and the at least one further layer (ii) each have a layer thickness in the range from ≥20 to ≤200 μm.

5. The layered structure as claimed in claim 1, wherein at least one layer of the at least one layer (i) and/or the at least one further layer (ii) comprises a laser-sensitive additive.

6. The layered structure as claimed in claim 5, wherein the laser-sensitive additive is present in this layer in an amount of 40 to 180 ppm.

* * * * *